US012236419B2

(12) United States Patent
Chen et al.

(10) Patent No.: US 12,236,419 B2
(45) Date of Patent: Feb. 25, 2025

(54) BLOCKCHAIN-BASED PRODUCT AUTHENTICATION SYSTEM

(71) Applicant: Touch Point Worldwide, Inc., Costa Mesa, CA (US)

(72) Inventors: Thomas Chen, Costa Mesa, CA (US); Jonathan Ko, Costa Mesa, CA (US)

(73) Assignee: Touch Point Worldwide, Inc., Costa Mesa, CA (US)

( * ) Notice: Subject to any disclaimer, the term of this patent is extended or adjusted under 35 U.S.C. 154(b) by 366 days.

(21) Appl. No.: 17/700,938

(22) Filed: Mar. 22, 2022

(65) Prior Publication Data

US 2022/0215382 A1  Jul. 7, 2022

Related U.S. Application Data

(63) Continuation-in-part of application No. 17/187,241, filed on Feb. 26, 2021, now Pat. No. 11,720,906.

(60) Provisional application No. 62/981,859, filed on Feb. 26, 2020.

(51) Int. Cl.
*G06Q 20/00* (2012.01)
*G06Q 20/36* (2012.01)
*G06Q 20/38* (2012.01)
*G06Q 30/0251* (2023.01)
*H04L 9/32* (2006.01)
*H04L 9/00* (2022.01)

(52) U.S. Cl.
CPC ..... *G06Q 20/3674* (2013.01); *G06Q 20/3821* (2013.01); *G06Q 30/0251* (2013.01); *H04L 9/3213* (2013.01); *H04L 9/3239* (2013.01); *H04L 9/3247* (2013.01); *G06Q 2220/00* (2013.01); *H04L 9/50* (2022.05)

(58) Field of Classification Search
CPC .......... G06Q 20/3674; G06Q 20/3821; G06Q 30/0251; G06Q 2220/00; G06Q 20/065; G06Q 20/02; H04L 9/3213; H04L 9/3239; H04L 9/3247; H04L 9/50
See application file for complete search history.

(56) References Cited

U.S. PATENT DOCUMENTS 10,977,456 B1   4/2021   Davis
11,201,981 B1  12/2021   Suiter et al.
11,348,152 B1   5/2022   Davis (Continued)

OTHER PUBLICATIONS

Search Report received in International Application No. PCT/US2023/015682, dated Jun. 15, 2023, in 2 pages.

*Primary Examiner* — Dante Ravetti
(74) *Attorney, Agent, or Firm* — Haynes and Boone, LLP

(57) ABSTRACT

Methods and systems are presented for providing instant authentication of a product and enhanced user experience with the product via blockchain technologies. A product verification system uses blockchain technologies to track the supply chain process of each instance (e.g., each copy) of a product. Upon receiving a request for authenticating an item, a code provided with the item is scanned. A token corresponding to an instance of a product is determined based on the code. The product verification system traverses a blockchain to access data associated with the token. The item is authenticated based on the data. Additional content provided by the supply chain and/or the manufacturer of the instance of the product may be presented on a user device in response to authenticating the item.

20 Claims, 9 Drawing Sheets

(56) References Cited

U.S. PATENT DOCUMENTS

| | | |
|---|---|---|
| 11,475,494 B1 | 10/2022 | Davis |
| 11,556,726 B2 | 1/2023 | Davis |
| 2012/0066003 A1 | 3/2012 | Collier et al. |
| 2019/0325498 A1* | 10/2019 | Clark .................. G06Q 30/0643 |
| 2019/0340269 A1* | 11/2019 | Biernat ................... H04L 63/12 |
| 2021/0090449 A1 | 3/2021 | Smith et al. |
| 2021/0103938 A1 | 4/2021 | Bulawski et al. |
| 2022/0075845 A1 | 3/2022 | Bowen et al. |
| 2022/0284447 A1 | 9/2022 | Bulawski et al. |

* cited by examiner

BLOCKCHAIN-BASED PRODUCT AUTHENTICATION SYSTEM

CROSS REFERENCE TO RELATED APPLICATION

The present application claims priority to U.S. patent application Ser. No. 17/187,241, filed Feb. 26, 2021, and U.S. Provisional Patent Application Ser. No. 62/981,859, filed Feb. 26, 2020, which are incorporated herein by reference in their entirety.

TECHNICAL FIELD

The present specification generally relates to providing enhanced services associated with physical product based on blockchain.

BACKGROUND

As consumers are becoming more sophisticated, they begin to demand more information about the product that they purchase, in addition to the price and quality. For example, consumers may want to know the origins of the materials used to make the product (e.g., whether the product is made with sustainable materials, etc.), the process being adopted in manufacturing the product (e.g., is it environmentally friendly, is child labor involved, etc.), the additional processing that have been performed on the product, and so forth. Furthermore, as counterfeit goods are becoming more prevalent, consumers (or friends of the consumers) may desire to verify whether a product at hand is authentic. Thus, there is a need to provide a platform for providing supply chain information and authentication of physical products in real time for the users.

DETAILED DESCRIPTION

Figure 1:
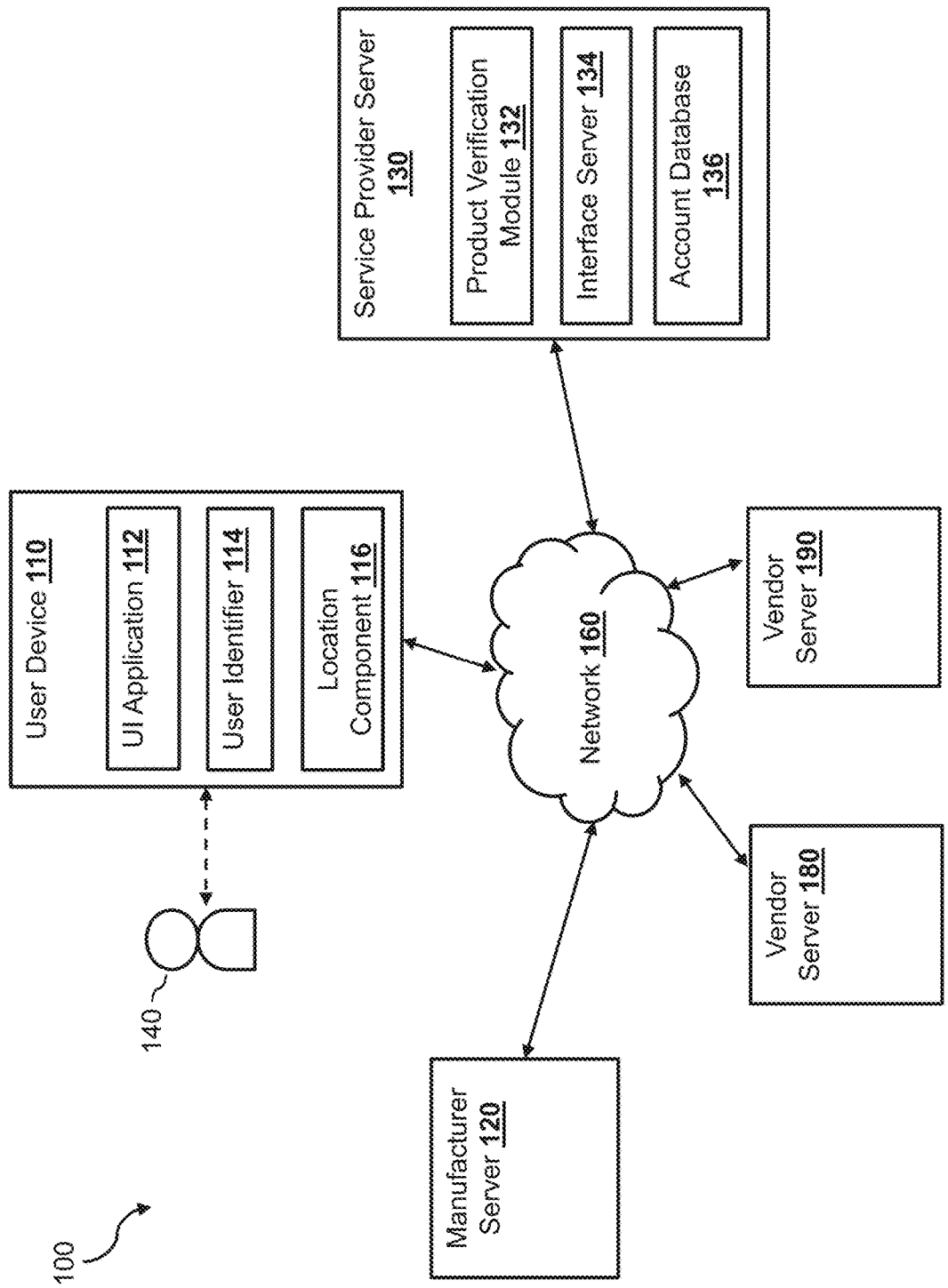
FIG. 1 is a block diagram illustrating a networked system that includes a product verification system according to an embodiment of the present disclosure.

The present disclosure includes methods and systems for providing instant authentication of a product and enhanced user experience with the product via blockchain technologies. In some embodiments, a product verification system may use blockchain technologies to track the supply chain process of each instance (e.g., each copy) of a product. For example, either automatically or upon a request by a manufacturer of the product, the product verification system may generate tokens for different instances (e.g., copies) or anticipated instances of the product. In some embodiments, a unique token is generated for each anticipated instance of the product. The token may also be referred to as a non-fungible token as each token is associated with a unique instance of a physical product. Furthermore, the content that is added to the blockchain in association with each token can be unique as well, as will be explained in more detail below.

The token may be initially stored in (and associated with) a digital wallet (also referred to as "wallet") associated with the product verification system or a digital wallet associated with the manufacturer. When production of the products begins, the product verification system may transfer the tokens to a digital wallet associated with a first entity in the supply chain process of the product (e.g., the entity that begins the manufacturing process, such as an entity that harvest raw materials for the product).

The transfer of the tokens to the wallet associated with the first entity causes a new transaction block to be recorded in a product blockchain structure (also referred to as a "blockchain" or a "ledger"). The new transaction block indicates a transfer of the corresponding tokens from the manufacturer (or the product verification system) to the first entity. In some embodiments, the product blockchain structure is generated by the product verification system and is associated with the product or products produced by the manufacturer such that any transactions (e.g., transfer of tokens) associated with instances of the product or products produced by the manufacturers will be recorded in the product blockchain structure. In some embodiments, the product blockchain structure is not associated with any particular product or manufacturer, and any transactions associated with any products may be recorded in the product blockchain structure or as metadata associated with the corresponding tokens.

As the first entity performs the task of preparing materials for instances of the product, the first entity may add content for the instances of the product. For example, via a user interface provided by the product verification system, the first entity may generate and add the content in association with the token. The content may be stored in a new transaction block that is recorded in the product blockchain structure, stored in the transaction block that indicates the transfer of the corresponding token from the manufacturer to the first entity, or stored in a separate data structure (e.g., a record in a separate database) that is associated with the token. The content may include information associated with the preparing of the materials, the origins of the materials, quality or other specifications associated with the materials, etc. Once the first entity finishes the task of preparing the materials for the instances of the product, the first entity may send the unfinished instances of the product to a second entity in the supply chain to perform other tasks in the production of the product.

In addition to sending the unfinished instances of the product, the first entity may also transfer the corresponding tokens from the wallet associated with the first entity to a wallet associated with the second entity. The transfer of the corresponding tokens may cause a new transaction block to be recorded in a product blockchain structure. The new transaction block indicates a transfer of the corresponding tokens from the first entity to the second entity. In some embodiments, the first entity may affix codes associated with the instances of the products in the unfinished instances of the product (e.g., an RFID tag, an NFC chip, a bar code, a QR code, etc.). As the unfinished instances of the product arrives at a facility of the second entity, the second entity may scan the unfinished instances of the product (e.g., using an RFID reader, an NFC reader, an image scanner, etc.). The scanning of the code may trigger the transfer of the corresponding tokens from the wallet associated with the first entity to the wallet associated with the second entity.

The second entity may perform additional processes on the unfinished instances of the product received from the first entity. As the second entity performs the additional processes, the second entity may also add content for the instances of the product. Similar to how content can be added by the first entity, the second entity may, via the user interface provided by the product verification system, generate and add the content in association with the tokens now in the possession of the second entity. The content may be stored in a new transaction block that is recorded in the product blockchain structure or stored in the transaction block that indicates the transfer of the corresponding token from the first entity to the second entity.

The content added by the second entity may be associated with the additional processes that are performed by the second entity, such as methods and processes being used by the second entity, skills of personnel involved in the process or specifications of machines that are involved in the process, qualities of the materials being added to the instances of the product, etc. Once the second entity finishes the additional processes on the unfinished instances of the product, the second entity may pass the unfinished instances of the product to a third entity in the supply chain. The second may also transfer the corresponding tokens from the wallet associated with the second entity to a wallet associated with the third entity. The transfer may cause a new transaction block to the recorded in the production blockchain. The new transaction block indicates a transfer of the corresponding tokens from the second entity to the third entity.

The tokens corresponding to the instances of the product may continue to be passed among the entities in the supply chain of the product in a similar manner as described herein until the manufacturing of the instances of the product is complete. The instances of the product as well as the corresponding tokens may be transferred back to the manufacturer after the manufacturing process is complete. Upon receiving the instances of the product and/or the corresponding tokens, the manufacturer may also insert content for the instances of the product. For example, via a user interface provided by the product verification system, the manufacturer may generate and add the content in association of the token. The content may be stored in a new transaction block that is recorded in the product blockchain structure, stored in the transaction block that indicates the transfer of the corresponding token from the last entity in the supply chain to the manufacturer, or stored in a data structure separate from the blockchain but associated with the token (e.g., a record in a database having an index associated with a token identifier of the token). The content added by the manufacturer may include information associated with the product (e.g., a serial number of the product, dimensions, colors, visual characteristics, edge-based attributes for object recognition, instruction manual, etc.), information associated with the manufacturer (e.g., a mission statement, etc.), advertisement content (e.g., text and/or multi-media content related to recommended products, etc.) and other information. It has been contemplated that the content generated and stored in association with the token by the manufacturer and/or the entities in the supply chain of the product may include text data, multi-media data (e.g., audio data, video data, etc.) and augmented reality data. Thus, the content can be incorporated within an image or video of the corresponding instance of the product. Since each instance of the product may be made from different materials (e.g., materials from a different source or origin, etc.) or made using a different process, the individualized tokens and their associated transaction blocks (or metadata) may include information that is specific to that instance of the product.

Based on the content associated with the instances of the product that has been added to the product blockchain and the transaction blocks that record the transfers of the tokens among the entities within the supply chain, the product verification system may use the tokens and the transaction blocks in the product blockchain to (i) track ownership of the instances of the product, (ii) verify the supply chain of the product, and (iii) provide additional information (e.g., information related to the supply chain of the product to the consumers or other users, information that the manufacturer wants to provide to the consumer, such as information about the product, information about other products produced by the manufacturer, etc., and user-generated data that is generated and added by previous owner(s) of the instances of the product).

Each instance of the product may include a unique code that is associated with a token assigned to the instance of the product. As discussed herein, the code may be incorporated within a data storage mechanism, such as an RFID tag, an NFC chip, that can be affixed and/or attached onto the instances of the product. The code may also be visually presented, such as a bar code, a QR code, etc. that can be shown or attached to the instances of the product. In a non-limiting example, the unique code may be generated based on hashing a token identifier of the token corresponding to the instance of the product. The unique code may be placed on the instance of the product (e.g., printed, engraved, embedded within an RFID tag, embedded within an NFC chip, etc.) or attached to the instance of the product (e.g., tied in a tag, etc.). A consumer of the product or others may use the product verification system to access enhanced services (e.g., enhanced user experiences, etc.) related to an instance of the product based on the code. For example, a user may use a user device to scan the code (e.g., obtaining an image of the bar code or QR code using a camera, reading the code using an RFID reader and/or an NFC reader, etc.). The user may submit the code to the product verification system (e.g., via a product verification application of the user device).

In some embodiments, the product verification system may provide a product verification application that can be installed in any user devices (e.g., personal computers, mobile devices, etc.). For example, a user who becomes an owner of an instance of the product (e.g., the user purchases the product) may use the product verification application on a user device to scan the code of the instance of the product to access the additional services. In another examples, users who are not owners of the instance of the product, but are in proximity (e.g., within a predetermined distance based on the technical capability of scanning the code, etc.) of the instance of the product, may also acquire certain additional services by scanning the code using the product verification application of their devices.

Upon receiving the code, the product verification system may provide additional services and/or enhanced user experience related to the instance of the product. For example, the product verification system may determine whether the instance of the product from which the code is captured can be authenticated based on the code and other information. The product verification system may prompt the user to capture an image of the instance of the product. The product verification system may also retrieve device attributes associated with the user device that submitted the code. The device attributes retrieved by the product verification system may include a geographical location detected by a geographical component of the user device (e.g., a GPS component), a network address (e.g., an Internet Protocol (IP) address, a media access control (MAC) address, etc.) of the user device, an identifier of the user of the user device (e.g., an account identifier, a name, an international mobile equipment identifier (IMEI), etc.), and other attributes.

The product verification system may attempt to determine a token corresponding to a particular instance of a product based on the code. For example, the product verification system may use a hash table or a "chain explorer" (a UI interface attached with an archive node of the blockchain which would contain all historical data of the chain) to map the code to a corresponding token. If no token is found from the code, the product verification system may determine that the instance of the product captured by the user device cannot be authenticated. If a token is determined based on the code, the product verification system may traverse the product blockchain to access data associated with the token (e.g., the data stored in transaction blocks associated with the token). The data retrieved from the blockchain may include identities of entities that possessed the token in the past (e.g., the entities in the supply chain of the product, the manufacturer, the previous owner(s), the current owner, etc.), the content generated and added by the manufacturer and the entities in the supply chain, and other information. The product verification system may also access a product authentication history associated with the instance of the product corresponding to the token.

In some embodiments, the product verification system may attempt to authenticate the instance of the product based on the data retrieved from the product blockchain, the product authentication history, the device attributes of the user device, and the image of the instance of the product captured by the user device. For example, the product verification system may analyze the image of the instance of the product and determine whether the image corresponds to physical attributes of the instance of the product. In some embodiments, the product verification system may use an object recognition algorithm (e.g., a scale-invariant feature transform (SIFT) algorithm, etc.) to extract features (e.g., edge-based features) of the instance of the product from the image. The product verification system may then compare the extracted features against the features of the instance of the product stored in the product blockchain. The product verification system may determine that the image captured by the user device corresponds to the instance of the product when the extracted features match the stored features by a threshold (e.g., 70%, 80%, etc.). If the product verification system determines that the image fails to correspond to the attributes stored in the product blockchain, the product verification system may determine that the instance of the product captured by the user cannot be authenticated.

In some embodiments, the product verification system may also detect suspicious activities regarding the instance of the product. For example, upon receiving the code, the product verification system may check the device attributes (e.g., the device identifier, the time when the code is received, the geographical location of the user device that submitted the code, etc.) against device attributes of previously authentication requests that include the code. If another request for authenticating the same instance of the product (e.g., including the same code) was submitted within a time threshold by another device (e.g., having a different device identifier) from another geographical location, the product verification system may determine that the instance of the product captured by the user device is likely a counterfeit, and would not authenticate the instance of the product. Other methodologies and heuristics may also be used to detect suspicious activities based on the device attributes of the user device and device attributes of devices used in previous requests.

If the product verification system determines that the instance of the product cannot be authenticated, the product verification system may transmit an authentication failure notification to the user device. The product verification application on the user device may present the notification to the user. On the other hand, if the product verification system authenticates the instance of the product, the product verification system may provide the user device access to the data associated with the corresponding token retrieved from the product blockchain. For example, the product verification system may transmit an authentication success notification to the user device. The product verification application of the user device may present the authentication success notification on the user device. In some embodiments, the product verification system may also transmit the data retrieved from the product blockchain, in association with the token, to the user device.

Upon receiving the data from the product verification system, the product verification application may present the data on the user device. As discussed herein, the data that has been added and stored on the blockchain in association with the token may include data supply chain data added by different entities within the supply chain for producing the instance of the product. The supply chain data may include illustrations of how the instance of the product was made. For example, the product verification application may present an interactive interface that illustrates the process of manufacturing the instance of the product based on the data received from the product verification system. For example, the interactive interface may show the entities involved in the supply chain of manufacturing the instance of the product, the materials and the methods being used to manufacture the instance of the product, the standards/specifications/rules that they follow during the manufacturing of the instance of the product, etc.

As discussed herein, the data may also include augmented reality data. As such, the content that is added to the blockchain in association with the instance of the product (e.g., by an entity within the supply chain of the instance of the product, by the manufacturer, by an owner or a previous owner, by the product verification system, etc.) may include programming code. The product verification application may store the augmented reality data (which may include programming code) on the user device when the augmented reality feature is not activated. When activated, the user device may execute the programming code to perform the augmented reality function. In some embodiments, the user device may activate the augmented reality feature in response to one or more trigger (e.g., when an image of a scene is detected on the display of the user device, etc.). Based on executing the programming code, the product verification application may monitor images and videos being captured by the user device. When the product verification application detects that an image of the instance of the product (or an object related to the product) is captured by the user device, the product verification application may superimpose augmented reality data onto the image. For example, the product verification application may analyze the image, and may superimpose augment reality data onto the image based on the analysis. In some embodiments, the augmented reality data may include multi-media data (e.g., audio data, video data, etc.). For example, the product may be a ring (e.g., a diamond ring, etc.). When the product verification application detects an image of a hand is captured by the user device, the product verification application may automatically superimpose an image of the ring onto a finger of the hand in the image. The product verification application may adjust the size of the image of the ring based on a size of the hand in the image.

In another example, the product may be a vehicle (e.g., a sports car). When the production verification application detects an image of the vehicle, the product verification application may superimpose alternative configurations (e.g., an upgraded engine component, an upgraded exhaust system, etc.) onto the image. In some embodiments, the augmented reality data may include audio data (e.g., the sound of the engine with the upgraded component, the sound of the upgraded exhaust system on the instance of the product, etc.), the product verification application may cause the user device to play the audio data as well.

The interactive interface that illustrates information of the supply chain of the instance of the product and the additional content that is presented to the user provides an enhanced user experience in association with the instance of the product, which cannot be accomplished without the use of the embodiments in the disclosure. In some embodiments, when a first consumer purchases the instance of the product from a retailer, the corresponding token is also transferred to a wallet of the first consumer. The possession of the token enables the first consumer to access the information associated with the instance of the product, and also add additional user-generated content for the instance of the product. For example, multi-media data such as images or videos that the first consumer generates (e.g., photos/videos of the instance of the product, of any modification or enhancement to the instance of the product, etc.) can be added for the instance of the product, via a user interface provided by the product verification system.

Consider an example of a professional athlete who may record his actions in a game (e.g., recording using a wearable device such as a pair of smart glasses or cameras affixed to his apparels such as his helmet, his jersey, etc.). The recording may show how he plays in the game from his perspective. After the game, the athlete may add the recording (or portions of the recording) to the blockchain in association with a token corresponding to his apparels (e.g., the helmet he wore in the game, his jersey, etc.). As such, when he subsequently sells his apparels to another person (and transfer the token to the subsequent owner), the subsequent owners may have access to those recordings based on the token.

In another example, a celebrity may record a movie she is shooting and/or an event in which she is performing from her perspective (e.g., using a camera affixed to her apparel). After the movie shoot or the performance, the celebrity may add the recording to the blockchain in association with a token corresponding to an instance of the product that she owns (e.g., a watch, a hat, a piece of jewelry, etc.). When she subsequently sells the instance of the product to another person (and transfer the token to the subsequent owner), the subsequent owners may have access to those recordings based on the token. Instead of or in addition to video recording, other user-generated data (e.g., digital art, audio recording, biometric data, etc.) may also be added to the blockchain.

The user-generated content can also be stored in the same manner as the content provided by the manufacturer and/or the entities in the supply chain such that the first consumer, other users who uses the product verification system to submit authentication request for the instance of the product, and subsequent purchasers of the instance of the product can access the content. For products that require maintenance (e.g., a car, etc.), records of the maintenance may also be added for the instance of the product by the first consumer as proof of maintenance in the future. As such, data associated with the life cycle of each instance of the product can be stored by the product verification system. This information can be provided to the manufacturer (after stripping sensitive data associated with the consumers) as feedback.

In some embodiments, even after the instances of the product have been sold to different owners, the product verification system may still allow other entities to continue to add new content to the blockchain in association with those instances of the product. For example, the manufacturer may add new content to the blockchain in association with the instances of the product for consumption by the owners or other people who scan the codes. The new content may include promotional data for promoting the product or other related products from the manufacturer (e.g., discount offers, advertisements, etc.). Thus, through the product verification platform (e.g., the product verification system and the product verification applications), the manufacturers can directly communicate with their consumers and others who may be interested in their products (e.g., the people who scan the codes associated with different instances of the product). The manufacturer may upload different promotional data to the blockchain at different times to provide new promotional content to the owners and other potential consumers of the product. In some embodiments, the product verification platform may enable the manufacturer to provide targeted promotional data. For example, the product verification platform may allow the manufacturer to provide different versions of promotional materials (e.g., for different products, for different discounts, for different incentives, etc.), and configurations for when the different versions of the promotional materials can be presented to user devices. The configurations may be location-specific (e.g., show a particular promotional material when the requesting device is located within a certain geographical area, etc.), time-specific (e.g., show a particular promotional material when the request is made at a specific time, etc.), demographic-specific (e.g., show a particular promotional material when the requester is within a certain age-range, is a particular gender, has a certain income range, etc.) or dependent on any attribute of the requester and/or the requesting device. The configurations and the different versions of the promotional materials may be stored in the blockchain (or in a data storage linked to the blockchain) and may be retrieved by a product verification application of a user device as the product verification application scans a code corresponding to an instance of the product. Based on the configurations and attributes of the user device, the product verification application may select and present one or more of the promotional materials. For example, the product verification application may determine a location of the user device, a time of day when the code is scanned, attributes of a user of the user device (e.g., an age, a gender, an income, etc.), and/or other attributes, and may select the appropriate promotional materials based on the attributes. This way, the manufacturers can provide targeted advertisement to the public through the product verification platform.

In some embodiments, the production verification platform may act as a managed service provider for facilitating advertisement space. For example, the product verification platform may enable third-party access to add additional content to the blockchain in association with instances of a particular product for a fee. Consider an example in which an aftermarket accessory manufacturer for a particular product (e.g., an aftermarket exhaust for a car model, etc.) may wish to provide advertisement to consumers who either own the product (e.g., the car model) or are interested in the product. The product verification platform may enable the aftermarket accessory manufacturer to add promotional content associated with the aftermarket accessory to the blockchain in association with instances of the particular product, for a fee. The content may include interactive data that enables the viewer to interact with a server associated with the aftermarket accessory manufacturer. This way, the product verification platform may enable the third-party to directly access potential consumers on a personal level.

In some embodiments, the production verification platform may provide access control to the content associated with the instance of the product. For example, based on an identity of the requester (e.g., an owner of the instance of the product, a person who is in proximity of the instance of the product and scans the code, etc.), the product verification platform may provide the requester accesses to different portions of the content. In one example, the product verification platform may allow the owner of the instance of the product accesses to all content on the blockchain in association with the token but may only allow other users who scan the code to access only a portion of the content (e.g., excluding content generated by previous and current owners, excluding special content generated by the manufacturer, etc.).

In some embodiments, a token representing an instance of a product, or the combination of the token and the content stored on the blockchain in association with the token, are referred to as a non-fungible token (NFT), which are transferrable between different users separate from the instance of the product, or in connection with the instance of the product. For example, a first user who is the owner of the NFT (who is also the owner of the corresponding instance of the product) may decide to sell the instance of the product to a second user. In addition to transferring the physical copy of the product, the first user may transfer the token (the NFT) from a wallet of the first user to a wallet of the second user. In another example, the first user may transfer the NFT (e.g., the token and all the content stored on the blockchain in association with the token) to the second user without transferring the physical copy of the product (e.g., keeping the instance of the product). Thus, the token (the NFT) can be treated as a separate asset independent of the corresponding physical copy of the product.

In some embodiments, the content that is added to the blockchain in association with the token may include a digital version of the instance of the product (which can be generated by the manufacturer, the product verification platform, or other entities), which can be manipulated within a computer virtual environment. The digital version of the instance of the product may include a digital object having a set of attributes. The set of attributes may describe the characteristics of the instance of the product as presented in the virtual environment (e.g., a size, a color, a style, a shape, etc.). The digital object may include a three-dimensional view of the copy of the product such that the digital object can be rendered as a three-dimensional object within the virtual environment. The digital object may also include the code that is attached to the physical instance of the product. In some embodiments, the product verification system may also facilitate the transport of the digital object into a virtual environment and between different virtual environments.

For example, the product verification system may establish communications with different virtual environment platforms (e.g., virtual environment platforms that support different computer games that can be played within different virtual environments, etc.). The product verification system may communicate with the different virtual environment platforms through a set of application programming interfaces (APIs) and may be configured to receive requests for importing digital objects associated with different real-world physical instances of products.

When a user submits a request to import a digital object associated with an instance of a product via a gaming console, the request may be forwarded to the product verification system through the set of APIs. The product verification system may request the user to submit proof of ownership of the corresponding token (e.g., by being authenticated as the owner of the digital wallet account that owns the token, such as encoding a message using a private key of the digital wallet account, etc.). In some embodiments, the user may use the product verification application to communicate credential data to the gaming console for completing the authentication process.

Once the user is authenticated and verified as the owner of the token, the product verification system may transfer data associated with the digital object to the virtual environment platform. The virtual environment platform may render the digital object within the game that the user is playing. Based on the characteristics specified in the digital object, the user may manipulate the rendering of the digital object within the game (e.g., wearing the digital object, carrying the digital object, presenting the digital object to other users in the virtual environment, using the digital object within the virtual environment, etc.). For example, if the instance of the product is a car, the user may drive the digital object rendered as a virtual car. If the instance of the product is a purse, the user may carry the digital object rendered as a virtual purse. In some embodiments, the user may also present other content that is stored on the blockchain in association with the token, such as the content added by the entities associated with the supply chain, the manufacturers, third-party entities, and previous/current owners of the token. The user may present the content within the virtual environment (e.g., in the game) or in a chat room associated with the game.

In some embodiments, the user may also transfer (e.g., sell) the digital object to another user within the game. The request to transfer the digital object may be transmitted to the product verification system via the virtual environment platform, and the product verification system may facilitate the transfer of the token from the digital wallet of the user to a digital wallet of the buyer in the game.

In some embodiments, the product verification system may establish communication with multiple virtual environment platforms such that the user may transport the digital object from one virtual environment to another virtual environment seamlessly.

Other players in the game may also initiate the product verification process as the avatars (e.g., virtual representations of the players) are in proximity (e.g., within a threshold distance) with the digital object in the game. For example, a player who is in proximity from the digital object may "scan the code" of the digital object by performing a predetermined action and/or motion in the game (e.g., waving at the digital object, jumping in front of the digital object, etc.). Once the player performs the predetermined action and/or motion with respect to the digital object, the virtual environment platform may transmit a product verification request to the product verification system via the set of APIs along with the code that is attached to the digital object. The product verification system may traverse the blockchain to perform the verification process in a similar manner as discussed here, and may present to the player (e.g., via the set of APIs) an indication of whether the digital object is authenticated or not. In some embodiments, the product verification system may also present, on a gaming console of the player who scanned the code of the digital object, certain selective content stored on the blockchain in association with the token.

FIG. 1 illustrates a networked system 100, within which the product verification system may be implemented according to one embodiment of the disclosure. Note that the present techniques may be applied in many different computing and technological environments, however, and are not limited to those shown in the figures. The networked system 100 includes a service provider server 130, a user device 110, a manufacturer server 120, and vendor servers 180 and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the service provider server 130 over the network 160. For example, the user 140 may use the user device 110 to submit a request for authenticating an instance of a product via a website hosted by, or a mobile application associated with, the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile application, etc.), which may be utilized by the user 140 to interact with the service provider server 130 over the network 160. In one implementation, the user interface application 112 includes a software program (e.g., a mobile application) that provides a graphical user interface (GUI) for the user 140 to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include a location component 116 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account (e.g., and a particular profile) maintained by the service provider server 130.

In various implementations, the user 140 is able to input data and information into an input component (e.g., a keyboard) of the user device 110. For example, the user 140 may use the input component to interact with the UI application 112 (e.g., to submit a code associated with a product, to retrieve content from third-party servers such as the service provider server 130, etc.).

The manufacturer server 120, in various embodiments, may be maintained by a business entity that produces and sells one or more products. Examples of business entities include a car manufacturer, a jewelry manufacturer, an accessory manufacturer, etc., which produces various products that can be sold to consumers directly or via retailers. The manufacturer may use the manufacturer server 120 to interact with the service provider server 130 and the vendor servers 180 and 190. For example, the manufacturer may use the manufacturer server 120 to submit, to the service provider server 130, a request for tokens for anticipated instances of a product to be manufactured. In addition, upon receiving the corresponding tokens, the manufacturer may use the manufacturer server to add, via a user interface provided by the service provider server 130, content for the instances of the product.

While only one manufacturer server 120 is shown in FIG. 1, it has been contemplated that multiple manufacturer servers, each associated with a different manufacturer, may be connected to the user device 110 and the service provider server 130 via the network 160.

Each of the vendor servers 180 and 190 may be associated with a different entity that is part of a supply chain of a product produced by the manufacturer of the manufacturer server 120. For example, a first entity associated with the vendor server 180 may be tasked to prepare raw materials for the product (e.g., steel for a car, diamond for a ring, etc.). A second entity associated with the vendor server 190 may be tasked to perform processing to the raw materials provided by the first entity. Each one of the vendor servers 180 and 190 may be used by the corresponding entity to interact with the service provider server 130. For example, the entities may use the vendor servers 180 and 190 via a user interface provided by the service provider server, to add content for the instances of the product, to receive the corresponding tokens from the manufacturer or another entity, and to transfer the corresponding tokens to another entity or back to the manufacturer.

The service provider server 130, in one embodiment, may be maintained by an online service provider, which may provide product authentication and user experience enhancement services for the user 140 of the user device 110. The service provider server 130 may also include an interface server 134 that is configured to serve content (e.g., web content, product content, augmented reality content, etc.) to users and interact with users. For example, the interface server 134 may include a web server configured to serve web content in response to HTTP requests. In another example, the interface server 134 may include an application server configured to interact with a corresponding application (e.g., a product verification mobile application) installed on the user device 110 via one or more protocols (e.g., RESTAPI, SOAP, etc.). As such, the interface server 134 may include pre-generated electronic content ready to be served to users. For example, the interface server 134 may provide a user interface that enables the manufacturer of the manufacturer server 120 to submit a request for tokens. The interface server 134 may also provide a user interface that enables the manufacturer of the manufacturer server 120 and the entities associated with the vendor servers 180 and 190 to add content to the product blockchain for different instances of a product. Furthermore, the interface server 134 may also communicate with the UI application 112 and provide, via the UI application 112, a user interface that enables the user to submit a request for authenticating an instance of a product.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and manufacturers. For example, account information may include private information of users and manufacturers, such as one or more account numbers, passwords, digital wallets information, transaction history, Internet Protocol (IP) addresses, device information associated with the user account.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login or a request, and the user attributes may be utilized by the service provider server 130 to associate the user with one or more particular user accounts maintained by the service provider server 130 and used to determine the authenticity of a request from a user device.

In various embodiments, the service provider server 130 includes a product verification module 132 that implements product verification system as discussed herein. The product verification module 132 may issue (e.g., mint) tokens corresponding to various instances (or anticipated instances) of a product automatically or upon receiving a request from a manufacturer. The product verification module 132 may transfer the tokens to a digital wallet associated with a first entity in the supply chain of the product. The tokens may be transferred among the entities in the supply chain as the instances of the products are being manufactured/processed by the various entities. As the tokens are transferred between entities, the product verification module 132 of some embodiments may record the transaction in a new transaction block of a product blockchain (e.g., a ledger). Content may be generated by the entities and submitted to the product verification module 132. The product verification module 132 may add the content to the transaction blocks of the ledger.

After the instances of the products are sold to consumers, the product verification module 132 may receive requests for authenticating the instances of the products, for example, from the user device 110. The request may include a code captured (e.g., scanned, etc.) by the user device 110, which is located on or attached to the instance of the product. The product verification module 132 may determine a corresponding token based on the code. The product may authenticate the instance of the product based on device attributes of the user device 110, an image of the instance of the product captured by the user device 110, and/or data retrieved from the product ledger in association of the token. After authenticating the instance of the product, the product verification module 132 may work with the UI application 112 to present enhanced user content on the user device 110.

Figure 2:
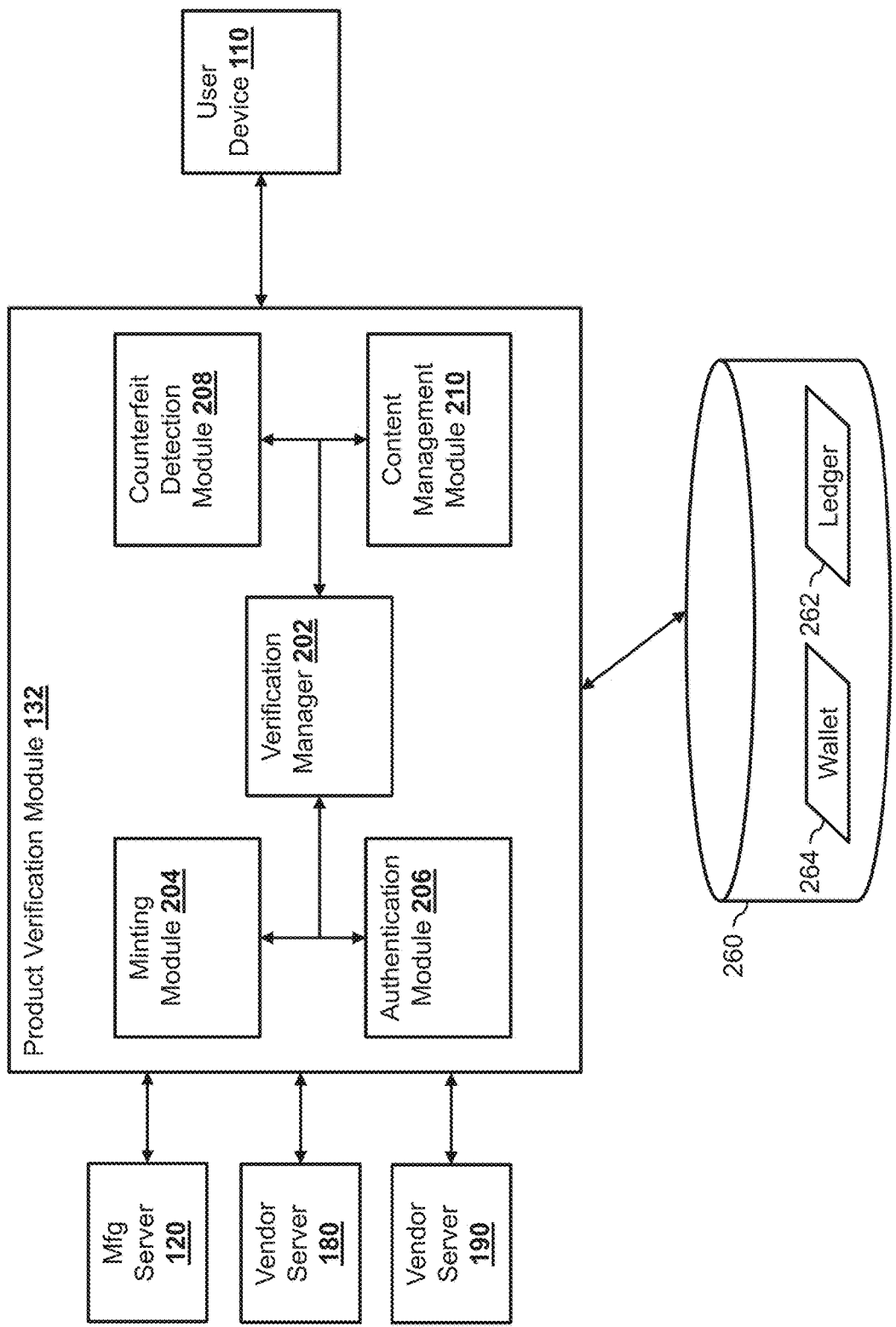
FIG. 2 is a block diagram illustrating a product verification module according to an embodiment of the present disclosure.

FIG. 2 illustrates a block diagram of the product verification module 132 according to an embodiment of the disclosure. The product verification module 132 includes a verification manager 202, a minting module 204, an authentication module 206, a counterfeit detection module 208, and a content management module 210. The product verification module 132 is communicatively coupled with a data storage 260 that is configured to store one or more ledgers for recording transaction records associated with various tokens issued by the minting module 204. In some embodiments, the verification manager 202 may provide a user interface (e.g., a website, a user interface application, a dashboard, etc.) on the manufacturer server 120 for interacting with the manufacturer. Via the user interface, the manufacturer may provide information associated with a product that the manufacturer plans to produce. In some embodiments, the verification manager 202 may receive product information that is entered into various fields shown on the user interface. The various fields may be customized to the specific industry of the manufacturer. In some embodiments, additional information fields can be created by the manufacturer. In some embodiments, the manufacturer may also automate this process by uploading a formatted CSV/xlsx file from their existing inventory software's database which contains populated fields corresponding to product information fields within the user interface. The automated uploading of the CSV/xlsx file will batch load product information to the product verification module 132.

The information may include a category of the product, a size of the product, a name and description of the product, and data associated with entities within the supply chain of the product. The information may also include a number of anticipated instances of the product to be produced (e.g., how many copies of the product does the manufacturer is producing). Upon receiving the information, the minting module 204 may begin issuing (e.g., minting) tokens for the anticipated instances of the product being produced by the manufacturer. In some embodiments, the minting module 204 may be configured to mint one token for each anticipated instance of the product. The tokens that are minted for each instance of the product may be referred to as non-fungible tokens (NFTs).

Figure 3:
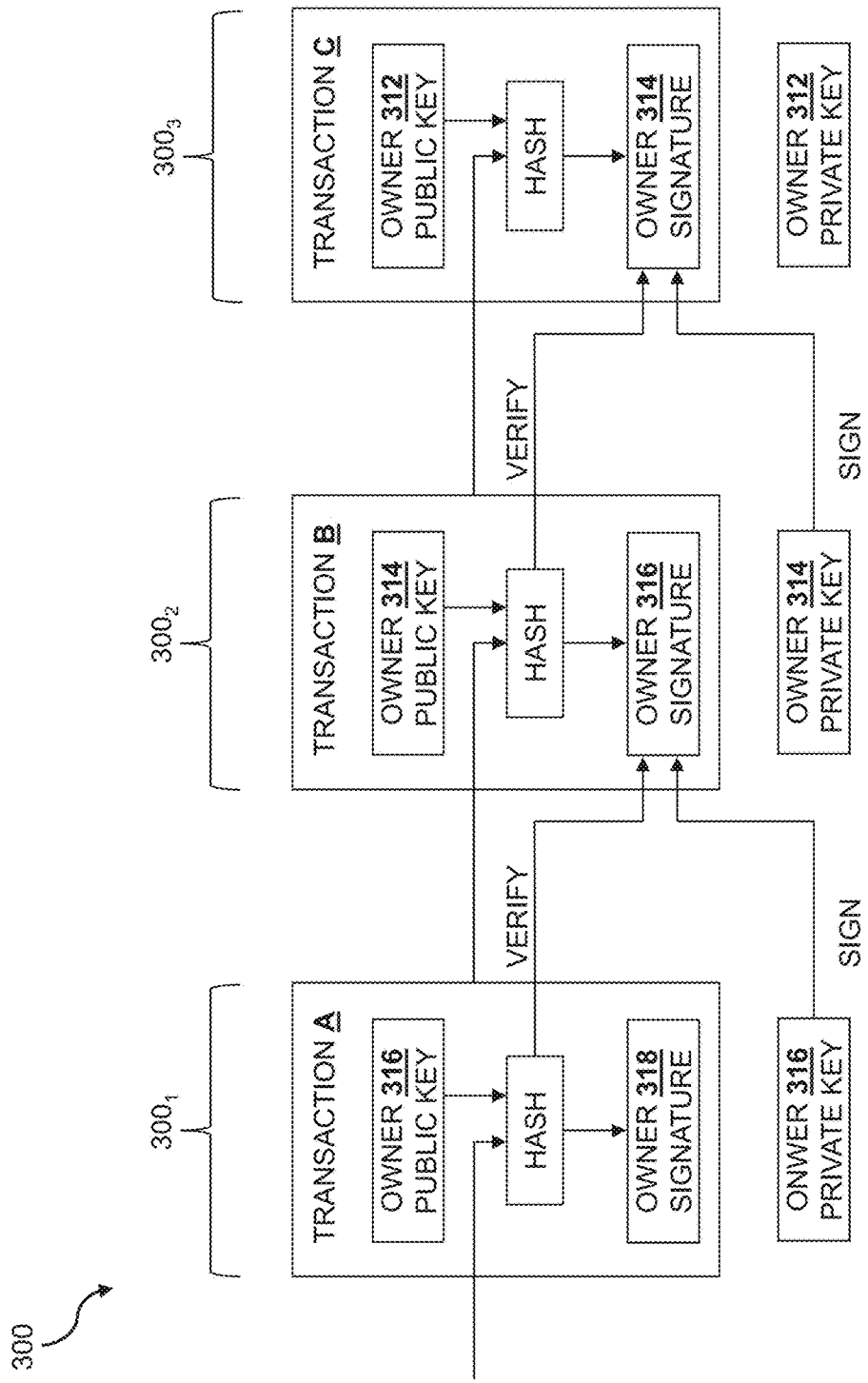
FIG. 3 is a schematic view illustrating an electronic token according to an embodiment of the present disclosure.

FIG. 3 illustrates an example electronic token 300 according to one embodiment of the disclosure. The electronic token (or simply as "token") 300 may be issued by the minting module 204 and may correspond to an instance of the product. The electronic token 300 is an electronic product that is transferrable among different parties based on a particular protocol. In some embodiments, the electronic token 300 may be defined as a chain of digital signatures provided by previous owners of the electronic token 300 to subsequent owners of the electronic token. In the illustrated embodiment, the electronic token 300 is owned by an owner 312, and FIG. 3 illustrates how the electronic token 300 is defined by the digital signatures of the previous owners 314, 316, and 318. Specifically, in transaction A, a hash of the public key of owner 316 (i.e., the owner receiving, as a result of transaction A, the electronic token $300_1$ defined by digital signatures provided up to transaction A) and the previous transaction (not illustrated, but occurring prior to transaction A) was signed by owner 318 (i.e., the owner providing, as a result of transaction A, the electronic token $300_1$ defined by digital signatures provided up to transaction A) using a private key and added to an initial electronic token (which was defined by digital signatures provided up to the transaction prior to transaction A) such that the electronic coin 302 was transferred to owner 316.

Similarly, in transaction B, a hash of the public key of owner 314 (i.e., the owner receiving, as a result of transaction B, an electronic token $300_2$ defined by digital signatures provided up to transaction B) and transaction A was signed by owner 316 using a private key and added to the electronic token $300_1$ such that the electronic token 300 was transferred to owner 314. Similarly, in transaction C, a hash of the public key of owner 312 (i.e., the owner receiving, as a result of transaction C, the electronic token $300_3$ defined by digital signatures provided up to transaction C) and the transaction B was signed by owner 314 using a private key and added to the electronic coin $300_2$ such that the electronic token 300 was transferred to owner 312. As is understood in the art, any payee receiving an electronic token (e.g., owner 316 in transaction A, owner 314 in transaction B, and owner 312 in transaction C) can verify the signatures to verify the chain of ownership of the electronic token 300.

Referring back to FIG. 2, upon minting (e.g., issuing) a new token (the new token having a unique token identifier), the minting module 204 may record the token (e.g., the token 300) in a ledger (e.g., a blockchain) 262 in the data storage 260. The minting module 204 may also store the information received from the manufacturer via the user interface in the ledger 262 (e.g., store the information in a new transaction block and append the new transaction block to the ledger 262, etc.) or in a separate data structure (e.g., a database) in association with the token (e.g., indexed using a token identifier of the token). In some embodiments, a network address (e.g., a uniform resource identifier (URI), a web address, etc.) may be assigned to each of the newly issued tokens and point to the information associated with the token in the data storage 260. In some embodiments, a hash of the product information from the data storage 260 in string format is stored as metadata on the corresponding token in the ledger 262.

Figure 4:
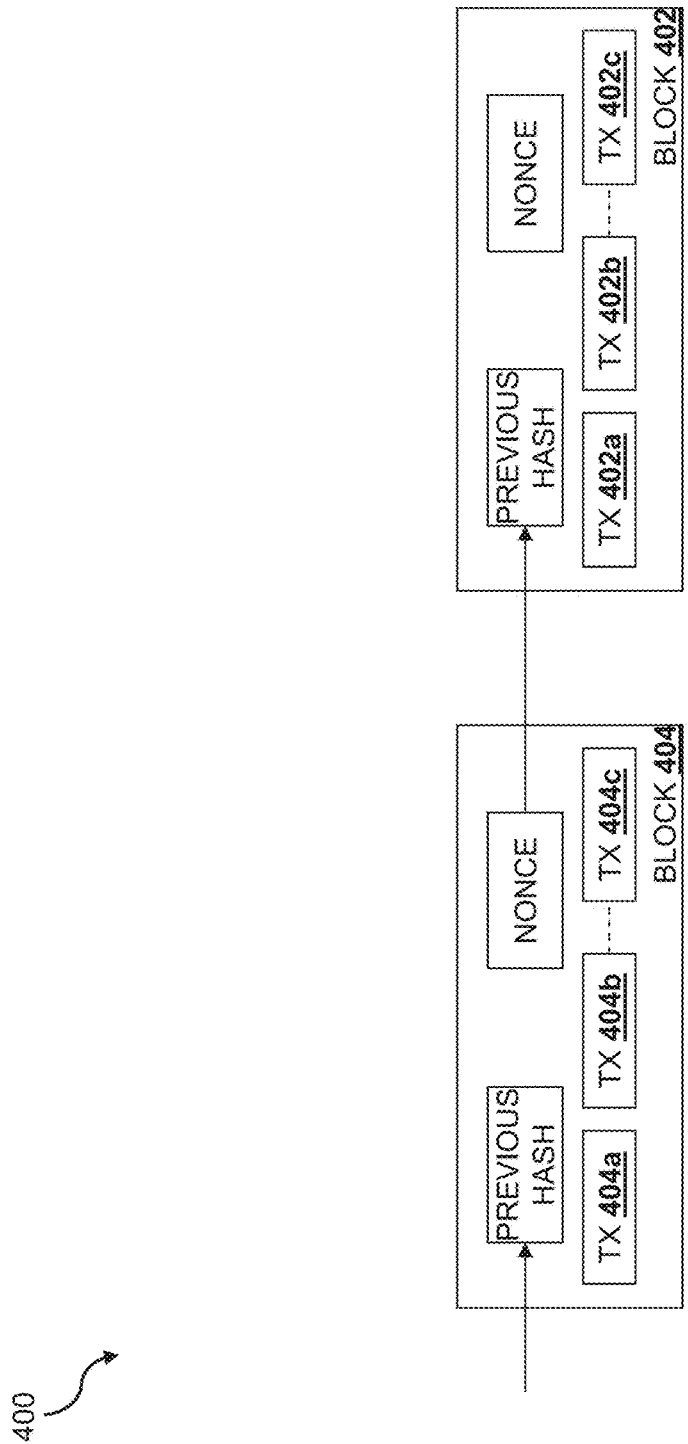
FIG. 4 is a schematic view illustrating a token transaction ledger according to an embodiment of the present disclosure.

In some embodiments, the newly issued tokens are transferred to a wallet associated with the product verification module 132 (e.g., the wallet 264). The transfer of the tokens to the wallet 264 may be recorded as new transaction blocks in the ledger 262. FIG. 4 illustrates an example ledger 400 according to one embodiment of the disclosure. The ledger 400 operates to verify previous transactions (e.g., transfer) and ownership of electronic tokens (e.g., referring back to FIG. 3, owner 316 in transaction A, owner 314 in transaction B, and owner 312 in transaction C) such that owners did not "double-spend" (e.g., use a private key to sign any previous transactions involving) that electronic token. To produce the ledger 400, a single device (e.g., the service provider server 130) or a distributed network of devices may operate to agree on a single history of transactions in the order in which they were received such that it may be determined that a transaction between a transferrer and a transferee of a token is the first transaction associated with that electronic token from the transferrer. Each device in the distributed network operates to collect new transactions into a block, and then to increment a proof-of work system that includes determining a value that when hashed with the block provides a required number of zero bits.

For example, for a block 402 that includes a plurality of transactions 402a, 402b, and up to 402c, a device in the distributed network may increment a nonce in the block 402 until a value is found that gives a hash of the block 402 the required number of zero bits. The device may then "chain" the block 402 to the previous block 404 (which may have been "chained" to a previous block, not illustrated, in the same manner). When devices in the distributed network find the proof-of-work for a block, that block (e.g., block 402) is broadcast to the distributed network, and other devices in the distributed network will accept that block if all the transactions in it are valid and not already transferred (which may be determined by creating the next block using the hash of the accepted block 402). The distributed network will always consider the longest chain of blocks to be the correct one and will operate to continue to extend it. In a Proof of Stake (PoS) system, a validator that correctly proposed the next block and the proposal is attested by a majority of validators, then the next block would be accepted as the correct one. If a device receives two different versions of a block, it will work on the first block received, but save the second block received in case the branch of the chain that includes the second block becomes longer (at which point that device with switch to working on the branch of the chain that includes the second block).

Referring back to FIG. 2, once an index of the tokens is generated, a database index is updated to display the newly minted tokens. The minting module 204 may also generate corresponding codes (e.g., bar codes, QR codes, codes that can be stored within an RFID tag and/or an NFC chip, etc.) for the tokens, and the mapping between the codes and the tokens are stored in the data storage 260. In some embodiments, the code may be generated based in part on hashing the token identifier of the token. The codes can be stored as images and may be downloaded to be printed in an NFC printer or uploaded individually to NFC chips. The minting module 204 may present the tokens and the corresponding codes on the manufacturer server 120 to indicate the successful minting of the tokens.

After the tokens are minted, the verification manager 202 may transfer the tokens to the wallet associated with a first entity within the supply chain of the product (e.g., the entity associated with the vendor server 180). The transfer of the tokens may cause a new transaction block to be recorded in the ledger 262. The new transaction block indicates the transfer of the token from the wallet 264 to the wallet of the first entity. As discussed herein, the verification manager 202 may provide a user interface on the vendor server 180, which enables the first entity to add content for the tokens. In some embodiments, different content may be added (and associated) with different tokens. For example, since different materials (e.g., different origins, different compositions, etc.) and different processes may be used in the manufacturing of the instances of the products, the first entity may provide content for a token that is specifically associated with the corresponding instance of product. Based on the content provided by the first entity via the user interface, the content management module 210 may store the content in association with the token. For example, the content management module 210 may store the content in a new transaction block in association with the token and chain the new transaction block to the ledger 262. In some embodiments, instead of storing the content in the ledger 262, the content management module 210 may store the content in a database that is indexed by the token identifier of the token.

The first entity may also, via the user interface, initiate a transfer of the tokens from the wallet associated with the first entity to a wallet associated with a second entity in the supply chain. Upon receiving a request for the transfer of the tokens via the user interface, the verification manager may record the transfer in the ledger 262 and provides a notification on the vendor server 190 of the second entity indicating the transfer of the tokens. In some embodiments, the transfer of the tokens from the wallet associated with the first entity to a wallet associated with the second entity may be triggered by a scan of the codes associated with the instances of the product (unfinished instances of the product) at a site of the second entity.

In a similar manner, the verification manager 202 may provide a user interface on the vendor server 190 that enables the second entity to add content for the different tokens that have been transferred to the second entity, and to transfer the tokens from the wallet associated with the second entity to a wallet associated with a third entity in the supply chain. The content manager 210 may store the content provided by the second entity in association with the corresponding tokens. The verification manager 202 may facilitate the transfer of the tokens. The tokens may continue to be transferred to different entities in the supply chain of the product until the manufacturing of the instances of the product is complete. The tokens may then be transferred back to a wallet associated with the manufacturer. In some embodiments, the tokens may follow the ownership (or possession) of the corresponding instances of the product. Thus, as the instances of the product are shipped to a retailer, the corresponding tokens may be transferred to the retailer. When an instance of the product is sold to a consumer, the corresponding token may also be transferred to a wallet associated with the consumer. Since each of the transfer of the token is recorded in the ledger 260, the transactions indicated by the transaction blocks in the ledger 260 may be used to determine a chain of ownership (or possessions) of each instance of the product.

Figure 5A:
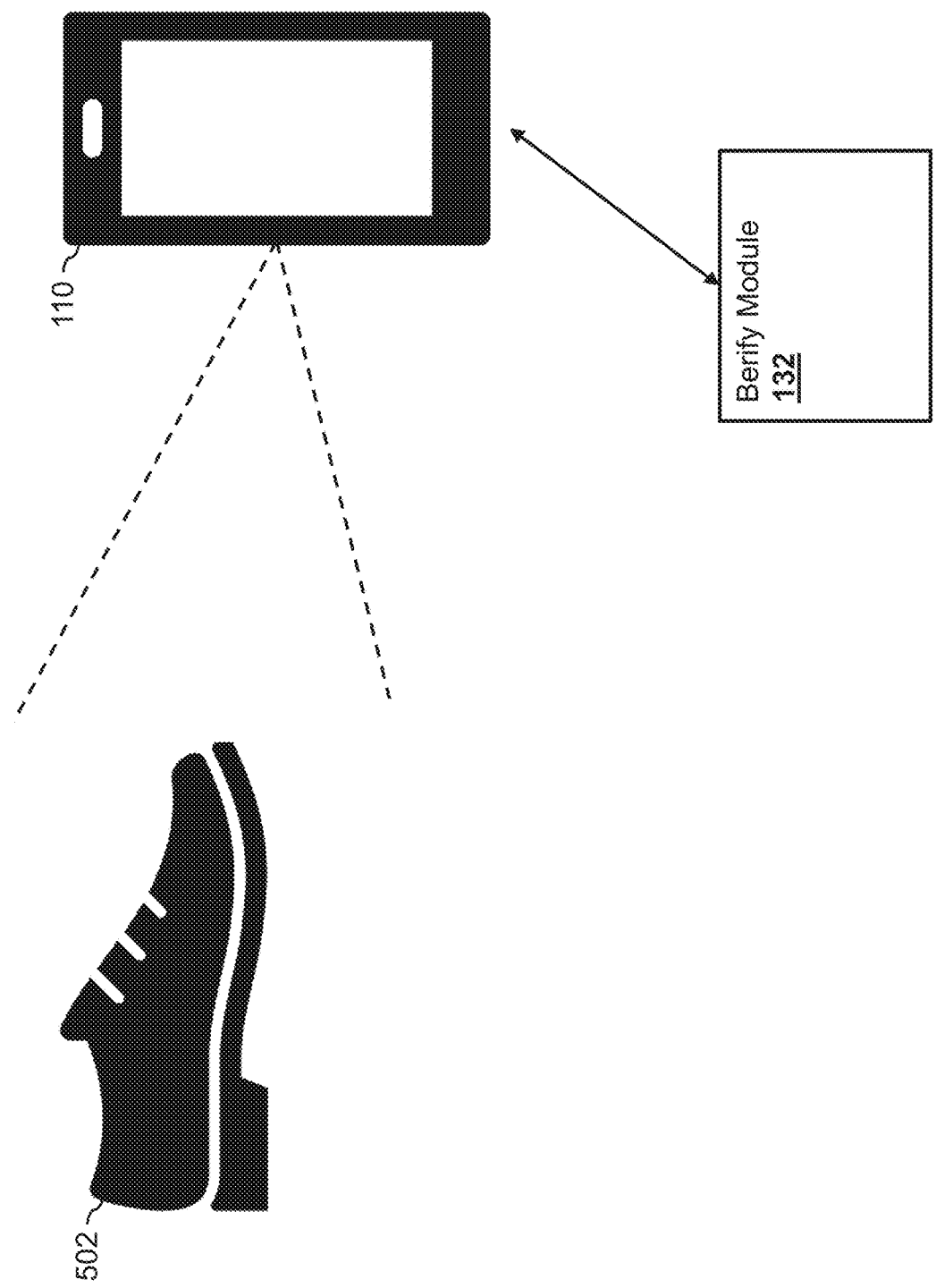
FIG. 5A is a schematic view illustrating interactions between a user device and the product verification system according to an embodiment of the present disclosure.

As discussed herein, codes that correspond to the tokens may be provided with the instances of the product (e.g., printed, engraved, attached an RFID tag and/or NFC chip to the product, etc.). A request (instances of the product) may be initiated via the UI application 112 (e.g., the Berify™ mobile application) by obtaining the code that is provided with the instance of the product (e.g., scanning the code, swiping the NFC chip, reading the RFID tag, etc.). FIG. 5A illustrates the initiation of a request according to some embodiments of the disclosure. The user 140 may have purchased an instance of the product 502 from a retailer or is in close proximity of the instance of the product owned/worn by another person. The instance of the product 502 in this example is a pair of shoes. As shown, the user 140 may use the user device 110 to obtain a code provided with that instance of the product 502. The user device 110 may include a camera for capturing an image of a bar code or a QR code. The user device 110 may also include an RFID reader for reading an RFID tag, and/or include an NFC reader for reading an NFC chip. Upon scanning the code, the UI application 112 of the user device 110 may transmit the request (which may include the code) to the service provider server 130.

Upon receiving the request and the code, the authentication module 206 may retrieve (or otherwise obtain) additional information from the user device 110 via application programming interface (API) calls. For example, the authentication module 206 may obtain device attributes of the user device 110 such as a geographical location of the user device 110 determined by the location component 116, a network address of the user device 110, a device identifier of the user device 110, a wallet account number of a wallet associated with the user 140, a device screen size, a default language, a color depth of a display, and other device specific data. In some embodiments, the authentication module 206 may also prompt the user 140 to capture an image of the instance of the product 502.

In some embodiments, the authentication module 206 may attempt to match the code with a token that was minted by the minting module 204. For example, the authentication module 206 may map the code to a token identifier in the data storage 260. If the code cannot be mapped to a token identifier, the authentication module 206 may determine that the code is invalid, and thus would not authenticate the instance of the product 502. The easiest example of how counterfeits are detected is when an unregistered code is scanned. This occurs when a fake code is sent to the product verification module 132 and the code does not match any of the token identifier on the ledger 262. Thus, the authentication module 206 may flag the code as invalid. The authentication module 206 may also store the invalid code in a blacklist within the data storage 260 such that any subsequent requests including the invalid code can be detected quickly. It is noted that the chance of generating a random token ID that happens to be the same as a registered token (aka a collision) would be astronomically small as $2^{256}-1$ combinations are possible, and even with even billions of tags generated a random collision from a third party would be highly unlikely.

However, a more sophisticated and likely scenario is a counterfeiter duplicating valid codes either by scanning a valid code from an instance of the product (or from another product) and providing the code on another instance of the product (e.g., the instance of the product 502). In some embodiments, the counterfeit detection module 208 may also perform a series of security measures to ensure that the code being obtained from the user device 110 corresponds to the instance of the product 502 associated with the request. For example, the counterfeit detection module 208 may use a combination of a history of previous authentication requests and device attributes to check a validity of the code. In some embodiments, the counterfeit detection module 208 may use a machine learning model that is configured to provide a likelihood of validity of the request based on the code, the attributes of the user device 110 obtained by the authentication module 206, and the history of authentication requests received by the product verification module 132. For example, the machine learning model may output a lower likelihood of validity when a previous authentication request that includes the same code is received (i) from a device having different device attributes and located at a location that exceeds a threshold distance from the location of the user device 110 and (ii) within an amount of time less than a threshold amount. The machine learning model may also output a lower likelihood of validity when a previous authentication request that includes the same code is received at the same time as the request from the user device 110 from another device having different device attributes. The machine learning model may also output a lower likelihood of validity when a number of authentication requests including the same code exceeding a threshold number have been received from devices with different attributes. The machine learning model may output a lower likelihood of validity when the request from the user device 110 was received at a time that is past an expiration date of the token (e.g., corresponding instance of the product is perishable, and the expiration date of the token corresponds to an expiration date of the instance of the product). The machine learning model may also output a lower likelihood of validity when a number of invalid authentication request that may or may not include the same code has been received from devices located within a predetermined distance threshold from the location of the user device 110.

In some embodiments, the counterfeit detection module 208 may traverse the ledger 262 to access data associated with the token corresponding to the token identifier while performing the security measures. For example, the authentication module 206 may not authenticate the instance of the product when the ledger 262 indicates that the mapped token has not been transferred to a retailer (e.g., not available for sale) at the time the authentication request is received from the user device 110. Additional security measures can be performed, such as checking hashes of a product identifier embedded in the token against a rehash of the product information database. Suspicious activity associated with the code (and/or the token) is given a specific weight within product verification module 132. Once the total of a weight reaches above a predetermined threshold for suspicious activity, the product verification module 132 will flag the token and all future authentication request associated with the token will be denied.

Anti-counterfeit measures will stop large sales of counterfeit products attempting to use forged codes but may not be able to stop small scale counterfeits, or "one-off" situations where a valid code is copied once in order to make a single sale. "One-off"s are much more likely in scenarios where malicious actors target low-volume, high value items such as designer bags, jewelry, expensive cosmetics or limited edition items like a signed jersey for counterfeiting. In the case of low-volume/high value items, an enhanced code may be provided to an additional layer of protection. The process of generating the enhanced code differs from a normal code in several ways:

(1) During the token minting process, the supply chain, product information, and a random seed code is generated and stored in the database in association with the token.
(2) The seed code instead of the token identifier is provided with the product.
(3) The physical tag containing the seed code is physically hardened against anyone attempting to read the code. This includes a tamper-proof seal on top of the seed code, or a RFID/NFC blocking material wrapped around the NFC chip containing the seed code that must be broken to be read by a device.
(4) Once the consumer decides to scan the tag, the code is exposed and the user logs into the UI application 112. They must be registered as a valid user.
(5) Once signed in, they provide the seed phrase to the authentication module 206 by scanning the code. When the code is matched to the database, a token is generated and written into the blockchain. The token is then transferred to that user's wallet.
(6) Any attempts to create a token with the same seed code are flagged as a counterfeit attempt.

A version of an enhanced security tag that alleviates both overhead of registration processes by the user and the overhead of issuing a token to the user at the point of registration is by just having physical security. This tag would be better suited for larger volume items that still need high security. This is a trade-off of security by putting the onus of security solely on the physical construction of the tag, while keeping the authentication of the tag by the user as simple as possible. For example, the tag is in the form factor of a sealed folded tag or an envelope-style form factor. The tag is sealed by adhesive, with perforations to open the tag. The envelope has tamper resistant material—for tags including a NFC chip, foil or similar NFC-blocking material over the front and back of the chip would prevent scanning through the exterior of the tag. By opening the tag, the foil on one side of the NFC chip would be removed, allowing the chip to be readable. For QR codes inside the interior of the tag, a construction of the tag in a thicker material or security print on the interior of the tag would prevent a malicious actor from scanning the QR code through the sealed tag. When opened the tag can be scanned as a normal code with the UI application 112.

When an authentication request is denied (or a determination that a particular instance of the product cannot be authenticated), the authentication module 206 may determine that the item associated with the authentication request is a counterfeit. In response to detecting the counterfeit item, the product verification module 132 may perform one or more actions, such as (1) collecting metrics regarding counterfeit activities and geographical region (e.g., which can be used to determine what regions have the highest amount of counterfeit activity, (2) providing a warning about a potential counterfeit item as a response to all subsequent authentication requests comprising the same code, and (3) if the token is not in possession of a user's wallet, the product verification module 132 may burn the token (e.g., removing any data associated with the token in the ledger 262). In the scenario where a valid token is destroyed, the legitimate owner may request a new token for that instance of the product. They are reissued a valid token for the product they purchased if they provide proof of ownership through credit card statements, receipt of purchase, etc.

If the authentication module 206 determines that the instance of the product can be authenticated based on the received code, the authentication module 206 may transmit a notification to the user device 110 indicating that the instance of the product is authenticated. Furthermore, the content management module 210 may generate and/or retrieve content for providing an enhanced user experience to the user 140 via the user device 110. For example, the content management module 210 may determine a history of the instance of the product based on traversing the ledger 262 and accessing data associated with the corresponding token within the ledger 262 and in the data storage 260. The content management module 210 may generate and/or retrieve content from the blockchain that is associated with the token corresponding to the instance of the product. The content management module 210 may present, on the user device 110 via the UI application 112, an interactive user interface to illustrate the content.

As discussed herein, the content that has been added to the blockchain may include data added by entities associated with the supply chain that manufactured the instance of the product. As such, the content presented by the content management module 210 on the user device 110 may include the history of the instance of the product, including the materials and methods used to produce the instance of the produce. In one embodiment, the history of the instance of the product is presented in a graphical chain, which shows the transfer of the instance of the product from one entity to another entity. The user 140 may select the different entities that have been involved (e.g., take possessions) of the instance of the product to learn more about it. Upon receiving a selection of the entity, the content management module 210 may present, on the user device 110 via the UI application 112, the content that was provided by the corresponding entity during the manufacturing of the instance of the product. Interaction data associated with how the user 140 interacts with the user interface provided through the UI application 112 may be transmitted to the product verification module 132, which enables the product verification module to determine additional metrics (e.g., what product information the user is scrolling to the most, what they select to see more in detail, how many users migrate to the user's website from the app to browse items, etc.). This information may be presented on a device associated with the service provider server 130.

The product verification module 132 may detect changes of product information associated with the instance of the product (e.g., recalls, maintenance updates, etc.), and may relay the changes to customers through the UI application 112, ensuring accountability to data integrity on consumer products. Product data is hashed and stored on a token upon creation, therefore any changes of the product data will result in a mismatch of the hash with the changed product data. At the time of authorization of the token, hashed product data from the scanned token on the blockchain is compared to the product data stored on servers. A result of a mismatch will let the consumer know that a product has had their product information changed. The producer can include a statement addressing why product information has changed intentionally, for instance in the event of a product recall or defect. Optimizations such as utilizing merkle trees for numerous products' data in batches for groups of produced products is also utilized to minimize database load.

As discussed herein, the content provided by the supply chain and/or the manufacturers for the instance of the product may include augmented reality (AR) content. The AR content may be presented on the user device 110 after the instance of the product is authenticated. The UI application 112 may detect (e.g., using one or more object recognition algorithms) that the instance of the product is included in an image captured by the user device 110. The UI application 112 may then superimpose (e.g., overlay) the AR content on the image. The UI application may detect the product within the image and generate a three-dimensional (3D) model that matches the placement of the instance of the product within the image in a 3D space. After authenticating the instance of the product via the UI application 112, additional AR features are unlocked such as personalized messages to the user or premium content such as exclusive videos and renderings. Additionally, unlocked features can also be available only after registering or collecting tokens of certain products.

The content may also include past and current ownership information of the instance of the product. For example, the content management module 210 may present the ownership chain of the instance of the product on the user device 110. The content may also include user-generated content provided by previous and/or current owners of the instance of the product. As discussed herein, a current owner may access a user interface provided by the product verification module 132 and may upload user-generated content via the user interface. The user-generated content may include data associated with the ownership of the instance of the product (e.g., enhancement, modifications done to the instance of the product by the owner, videos/audios recording ownership experience of the instance of the product, etc.). As such, an owner of the product (and/or a person scanning the code corresponding to the instance of the product) may access the user-generated content from previous and current owners via the product verification application. In some embodiments, the type of content provided to the user device 110 may depend on whether the user device 110 is associated with a digital wallet that has possession of the token corresponding to the instance of the product. As such, the current owner of the instance of the product may access certain content (e.g., certain user-generated content from previous owners, certain proprietary data from the manufacturer, etc.) that is inaccessible by a non-owner. Thus, the content management module 210 may select portions of the content from the blockchain in association with the instance of the product based on whether the requesting device has possession of the token.

In some embodiments, the manufacturer of the instances of the product may continue to provide new content to the blockchain in association with the instances of the product even after the instances of the product have been sold to consumers. For example, the manufacturer server 120, via the UI provided by the product verification module 132, may add new content to the blockchain in association with the instances of the product for consumption by the owners or other people who scan the codes. The new content may include promotional data for promoting the product or other related products from the manufacturer (e.g., discount offers, advertisements, etc.). Thus, through the product verification module 132 and the product verification applications, the manufacturers can directly communicate with their consumers and others who may be interested in their products (e.g., the people who scan the codes associated with different instances of the product). The manufacturer may upload different promotional data to the blockchain at different times to provide new promotional content to the owners and other potential consumers of the product. In some embodiments, the product verification module 132 may enable the manufacturer to provide targeted promotional data.

For example, the product verification module 132 may allow the manufacturer to provide different versions of promotional materials (e.g., for different products, for different discounts, for different incentives, etc.), and configurations for when the different versions of the promotional materials can be presented to user devices. The configurations may be location-specific (e.g., show a particular promotional material when the requesting device is located within a certain geographical area, etc.), time-specific (e.g., show a particular promotional material when the request is made at a specific time, etc.), demographic-specific (e.g., show a particular promotional material when the requester is within a certain age-range, is a particular gender, has a certain income range, etc.) or dependent on any attribute of the requester and/or the requesting device. The configurations and the different versions of the promotional materials may be stored in the blockchain (or in a data storage linked to the blockchain) and may be retrieved by a product verification application of a user device as the product verification application scans a code corresponding to an instance of the product. Based on the configurations and attributes of the user device, the product verification application may select and present one or more of the promotional materials. For example, the product verification application may determine a location of the user device 110 that scans the code, a time of day when the code is scanned, attributes of a user of the user device (e.g., an age, a gender, an income, etc.), and/or other attributes, and may select the appropriate promotional materials based on the attributes. This way, the manufacturers can provide targeted advertisement to the public through the product verification platform.

Figure 5B:
FIG. 5B illustrates an example user interface provided by the product verification module according to an embodiment of the present disclosure.

FIG. 5B illustrates an example user interface 520 provided by the product verification module 132 that enables different entities (e.g., an entity within the supply chain of an instance of a product, a manufacturer, an owner of an instance of a product, a third-party, etc.) to provide content to the blockchain in association with the instance of the product. The content may be received by the product verification module 132 via the user interface 520. The product verification module 132 may store the content in the blockchain 262 in association with the instance of the product and may provide different users access to the content upon detecting an event (e.g., scanning of a code corresponding to the instance of the product, etc.).

Having tokens on the blockchain to verify supply chain for the consumer has many benefits not currently present in existing solutions.

Ownership—For example, using the UI application 112, the user associated with a wallet may claim ownership of items (instances of products) via tokens (if this functionality is defined and enabled by the client minting the tokens). They can do this by transferring the token corresponding to the instance of the product to their personal wallet managed by the UI application 112, by requesting a token transfer within the UI application 112 via services provided by the product verification module 132. If they want to resell an item, they can transfer the token by cryptographically signing with their private key that they own a certain product—ownership can be verified by any other users (or through the use of a blockchain explorer connected to the ledger 262 if federated). Signing a product can be done by the UI application 112 via a simple push-button interface.

Client Rewards—Users can collect tokens on the products they own. Once they claim ownership of the items, rewards can be given out by the client to the user depending on several metrics. For instance, a consumer who bought 5 products from the client's store and claimed ownership of all the products will get a gift sent to them by the client or are invited to a product unveiling. Another example is where clients who own n-number of items claimed will have premium AR features unlocked for their product in the UI application 112. Or if users claim certain types of items will have specific rewards and discounts unlocked.

Trading—users who wish to participate can allow trading of claimed tokens. The rewards system along with trading can incentivize users to trade tokens to claim rewards. Allowing cross-client trading using the ERC-721 standard between other tokenized items can allow users to generate a cross-product token trading market. If desirable, cross-token trading can also be performed if product verification module 132 creates tokens on Ethereum mainnet, allowing for token-for-crypto trading.

Use Cases

Example 1—A car is tokenized by product verification module 132. A consumer buys the car and claims ownership of the car's token, transferring the token to the consumer's wallet. The consumer puts the car on a third-party market and prove ownership by digitally signing with their digital wallet that they own that car. Another user buys the car and gets the token transferred to the buyer's wallet upon purchase. The current owner, who already owns the same brand of car, now owns two of those car tokens (their previous car and the second-hand car they just purchased). The UI application notifies them they are now eligible to go to the next car unveiling.

Example 2—Another example is a consumer buys many different cosmetic products that are all tokenized by the product verification module 132. The consumer claims the tokens, but rather than trading them for rewards from the cosmetic shop, the consumer trades tokens with another user for tokens from a boutique bag store in order to claim a significant discount for a bag. The user they traded with who now claims the cosmetic product tokens gets a discount on their next cosmetics purchase.

Example 3—A consumer buys a pair of pants tokenized by the product verification module 132. However, rather than trading with another user for other tokens, the consumer decide that she wants a fraction of a Bitcoin. She goes on an exchange and trade the token for Bitcoin, which she receives via her digital wallet.

Entity Registration on the Product Verification System in a Public and Private Blockchain Implementation There are two implementations of how the entities in the supply chain are correlated with the instances of the products. The first case is for a private blockchain and the second is for a public blockchain network.

In the use case of a private federated chain, the product verification module 132 is registering the supply chain entities to their wallets. A private federated chain would be selected for many different reasons. These would include:
(1) Need for high volume of products on-chain and need for high bandwidth for creating, reading, and storing products on-chain
(2) Security and privacy concerns of certain product information
(3) Lower cost of deployment and upkeep
(4) Trusted sources and brands where full transparency is not needed On a private chain, the product verification module 132 creates wallets equivalent to the number of entities in each supply chain and registers the entities by storing their relevant information (name, role in the supply chain such as producer, manufacturer, shipper, licenses, certifications, etc.). and their associated wallet address onto a database. (See documentation for wallet generation under https://hyperledger-fabric.readthedocs.io/en/release-1.4/devel-opapps/wallet.html for Hyperledger and https://web3js.readthedocs.io/en/v1.2.0/web3-eth-accounts.html for web3 for Ethereum implementations).

All transactional history of the tokens is stored by a blockchain transaction indexer stored on a database (within the data storage 260). The indexer is attached to a blockchain explorer, which organizes the data into wallet histories, token histories, and token inspectors. A genesis smart contract (or chaincode contract) will create all tokens within a genesis wallet and send them to the wallet that represents the first entity in the supply chain. When the first entity is finished with their part in the supply chain, they transfer the token to the next wallet owned by the next entity in the supply chain.

If the entity or entities do not wish to directly participate in passing tokenized products through on the blockchain for various reasons (difficulty using blockchain due to regulations, concerns with integration into supply chain process, security concerns of holding their own private keys for their wallets, etc.) or the distributor is white-labeling the products from many different sources, the product verification system 132 or the white-labeler will create and hold all wallets associated with entities of the supply chain.

Any action performed by wallets (i.e., transferring tokens received to another entity) is effectively tied to the entity and retrievable by a token explorer. In the case where the product verification module 132 gives entities their respective private keys for their associated wallet and a light wallet client, clients pass tokens to the next entity's wallet in the supply chain. The passing of the token from wallet to wallet mirrors the product moving from supply chain entity to the next entity, effectively storing a tokenized product's history that mirrors the physical product's history.

In the case where the product verification module 132 or the white-labeler holds all of the wallet's private keys, during manufacturing process, the product verification module 132 will pass the tokens through each wallet, mirroring the transfer of the product through the supply chain on behalf of the entities and effectively recording the supply chain history on the chain.

As an additional security layer, the product verification module 132 can also create a multi-sig wallet where both the product verification module 132 and the white labeler need to sign off on every transaction to guarantee that the product has gone through proper processes before sending the tokens through the sequence of wallets.

In a public implementation many of the processes found within the product verification module 132 would be off-loaded to the public chain. A public implementation would be selected for several reasons:

(1) Transaction bandwidth of public Ethereum chain is adequate for tokenizing all assets of a supply chain including creating, reading, and storing products on-chain.
(2) Privacy is unnecessary, or solutions for privacy are created such as with ZK-rollups, AZTEC protocol, or other privacy layers built on Ethereum.
(3) Costs of minting, smart contracts, and transactions on the public chain are shouldered by the entities signing with the product verification module 132.
(4) Full transparency is necessary for maintaining trust of the supply chain data.

The wallets could be created independently by entities, such as through Ledger, Metamask, and MEW and registered on a smart contract that maintains a record for every entity for a specific supply chain process. A new smart contract would be created for every new group of entities. Entity metadata would be stored on a distributed file system such as IPFS in addition to the product verification module 132 to guarantee transparency as the product verification module 132 would not be able to edit or change the entity metadata. Token transaction history would be cataloged by public blockchain explorers such as etherscan.io or c-houn-d.ai databases, and optionally stored on the data storage 260 for fail-over reliability or for speed of retrieval on authentication.

Entities would hold onto their own private keys to their wallets and would be responsible for sending tokens through to the next in line for the supply chain using their choice of wallet, removing the possibility of the product verification module 132 or the white-labeler as a possible bad actor in the process. A smart contract will create all tokens and place them in a genesis wallet, with a smart contract automating the process of sending the tokens to the first supply chain entity in batches as they produce their goods and offload products to other entities.

Data Retrieval after Authentication

When the QR/NFC chip is scanned the token authentication process begins. The token information is first sent from the UI application 112 to the product verification module 132. The process of the retrieving the supply history and matching it with specific entities occurs in order:

(1) Product information metadata is retrieved from the token URI location. This includes specific product metadata that was listed by the seller of the final product.
(2) The token transaction history is retrieved from the indexed database linked to a blockchain explorer. The transaction data includes all previous wallets the token was transferred from, and the sequence in order of how the token was transferred. Date information is also retrieved.
(3) The product verification module 132 matches the token wallet addresses with entity metadata (such as name of the entity and their role in the supply chain) and retrieves it
(4) The product verification module 132 sends the retrieved information to the UI application 112 of the user device 110.
(5) To improve performance of the app, additional information of the entity is retrieved only when a user clicks into a supply chain entity and sent to the app to populate detailed views of a specific part of the supply chain.
(6) The product information and supply chain are arranged in a graphical chain, where the user can select into a specific entity to read more information.

Information can be listed on the entity such as: name, date established, certifications, location, what they are classified as in the supply chain (source/producer/manufacturer/packager, etc.) product, date of entities' processes, additional information the entity, etc.

Figure 6:
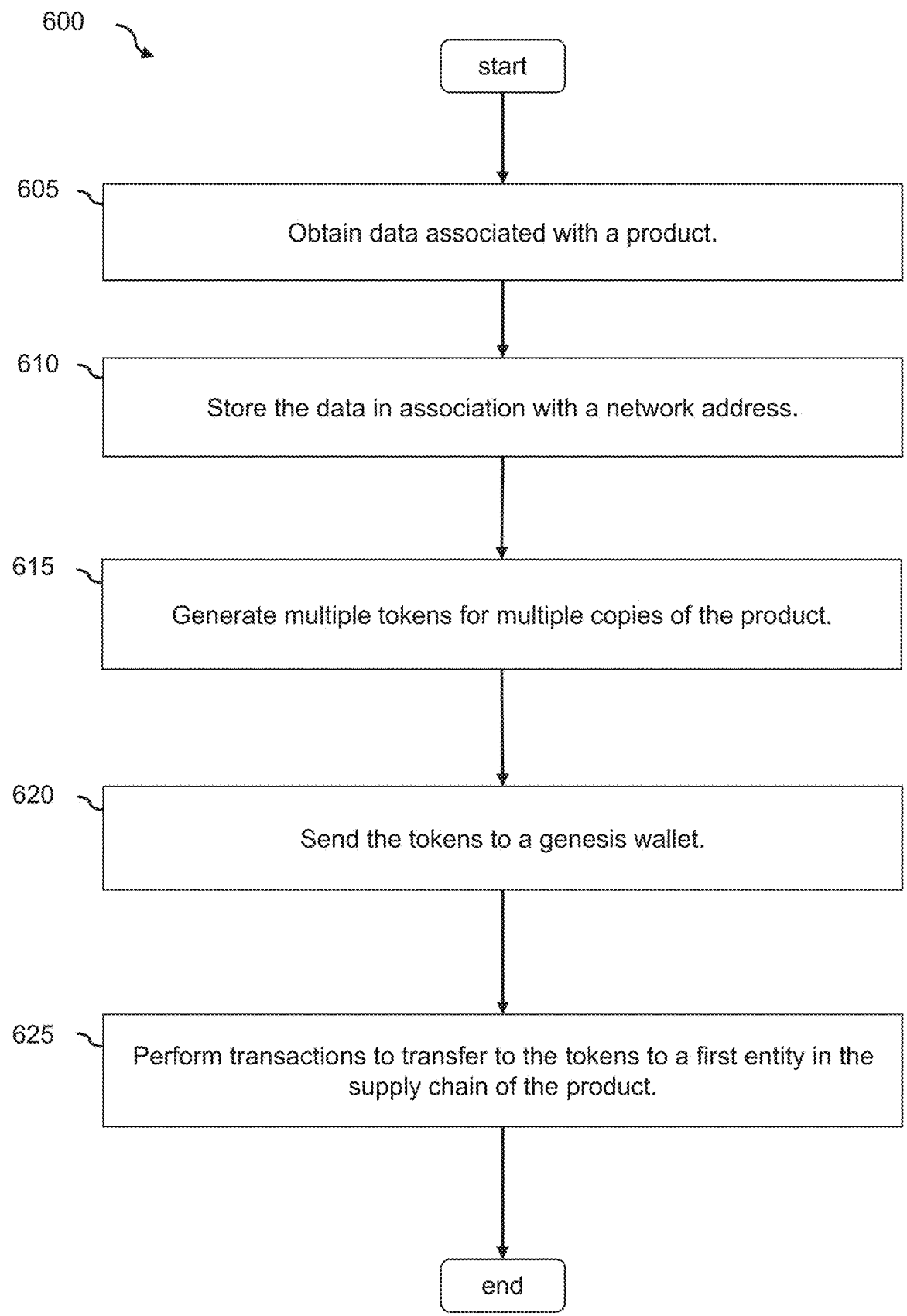
FIG. 6 is a flowchart showing a process of tokenization for a product according to an embodiment of the present disclosure.

FIG. 6 illustrates a process 600 for issuing tokens for instances of a product according to various embodiments of the disclosure. In some embodiments, at least a portion of the process 600 may be performed by the product verification module 132. The process 600 may begin by obtaining (at step 605) data associated with a product. For example, the verification manager 202 may obtain product information associated with a product from the manufacturer via a user interface provided on the manufacturer server 120. The process 600 then stores (at step 610) the data in association with a network address. For example, the verification manager 202 may store the data in the data storage 260. The verification manager may also generate a network address (e.g., a URI, etc.) that points to the data stored in the data storage 260.

The process 600 generates (at step 615) multiple tokens for multiple copies of the product. Based on the number of anticipated instances of product being manufactured by the manufacturer, the minting module 204 may issue (e.g., mint) tokens, where each token may correspond to each anticipated instance of the product. The process 600 then sends (at step 620) the tokens to a genesis wallet and performs (at step 625) transactions to transfer the tokens to a first entity in the supply chain of the product. The verification manager 202 may initially transfer the tokens to a genesis wallet 264 associated with the product verification module 132. The verification manager 202 may then transfer the tokens to a wallet associated with a first entity in the supply chain of the product.

Figure 7:
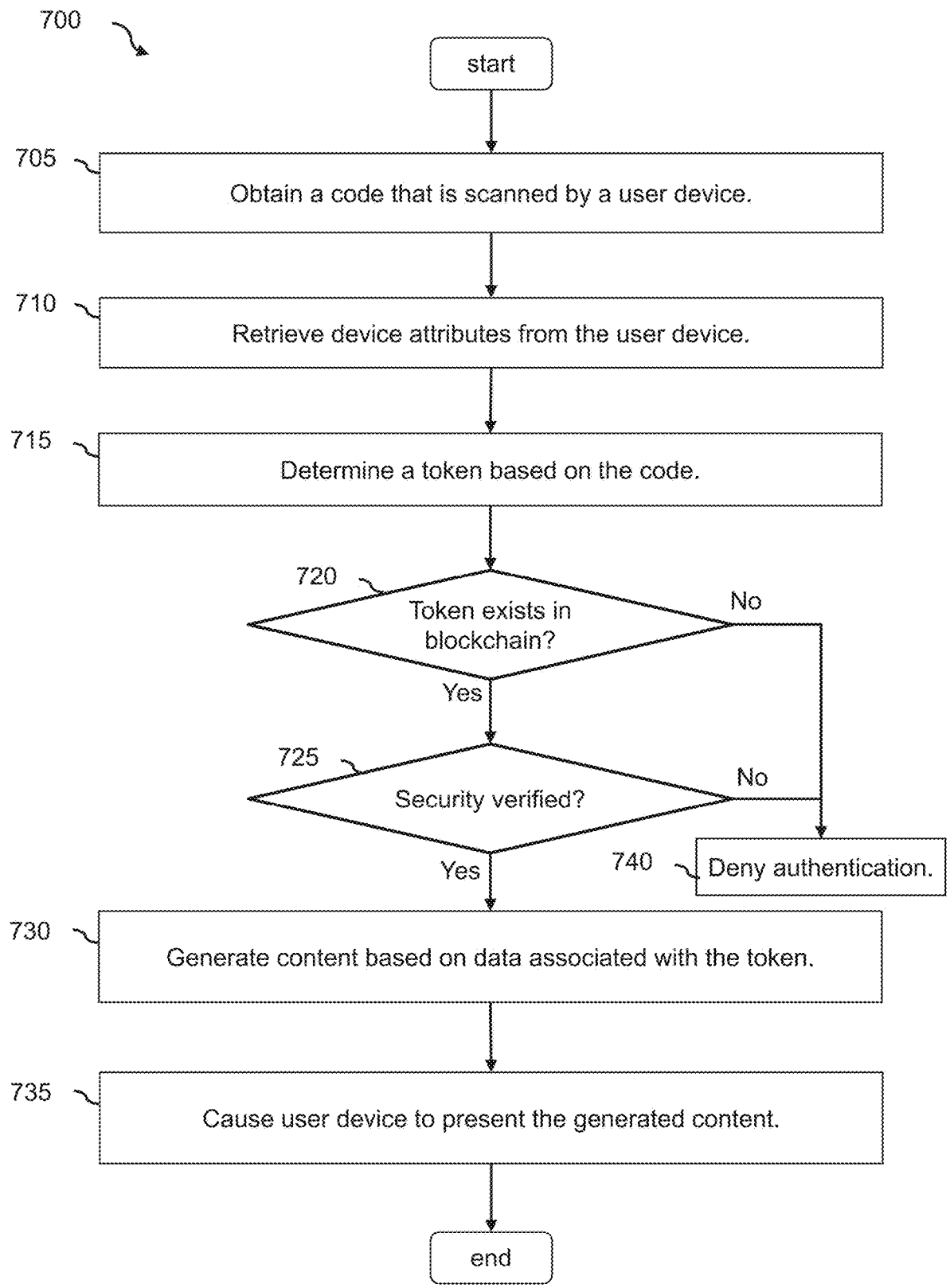
FIG. 7 is a flowchart showing a process of performing authentication of a product according to an embodiment of the present disclosure.

FIG. 7 illustrates a process 700 for authenticating an instance of a product based on a token according to various embodiments of the disclosure. In some embodiments, at least a portion of the process 700 may be performed by the product verification module 132. The process 700 may begin by obtaining (at step 705) a code that is scanned by a user device. For example, the product verification module 132 may receive a request for authenticating an item from a UI application 112 of the user device 110. The process 700 then retrieves (at step 710) device attributes from the user device. For example, the authentication module 204 may retrieve attributes from the user device 110, such as a geographical location, a network address, a color depth of a display, a device identifier, or other device specific information.

The process 700 then determines (at step 715) a token based on the code and determines (at step 720) whether the token exists in the blockchain. For example, the authentication module 206 may use an index to map the code to a token. The authentication module 206 may traverse the ledger 262 to determine whether transaction blocks associated with the token exists within the ledger 262. The process 700 denies (at step 740) an authentication request when it is determined that the token does not exist in the block chain.

The process 700 then determines (at step 725) if the token is verified and denies (at step 740) the authentication request when the token is not verified. For example, the counterfeit detection module 208 may use the device attributes and a history of previous authentication requests to determine a likelihood that the item is a counterfeit. If it is determined that the likelihood that the item is a counterfeit exceeds a threshold, the verification manager 202 denies the authentication request. On the other hand, if the token is verified at step 725, the process 700 generates (at step 730) content based on data associated with the token and causes (at step 735) the user device to present the content.

Figure 8:
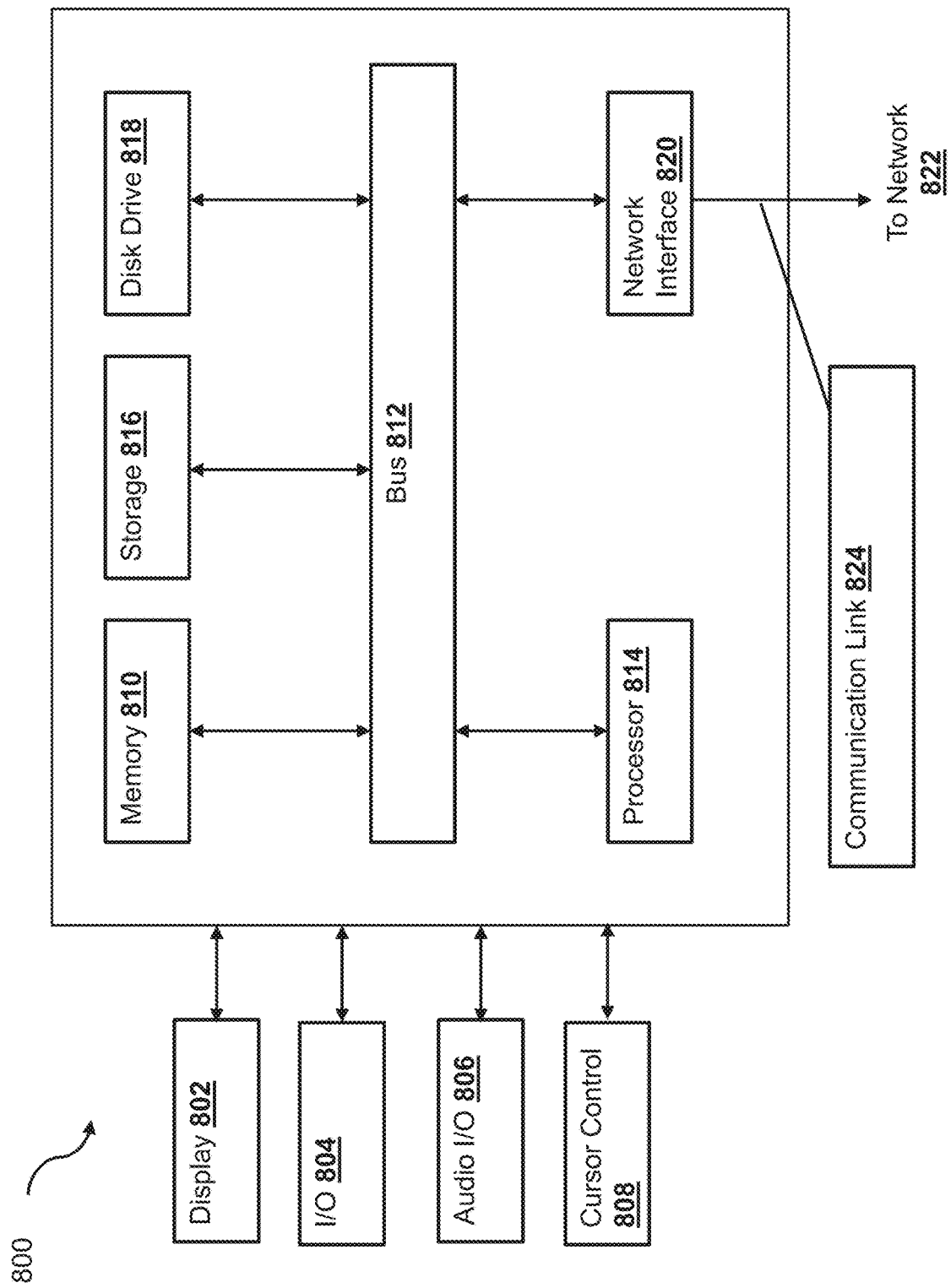
FIG. 8 is a block diagram of a system for implementing a device according to an embodiment of the present disclosure.

FIG. 8 is a block diagram of a computer system 800 suitable for implementing one or more embodiments of the present disclosure, including the service provider server 130, the manufacturer server 120, and the user device 110, and the vendor servers 180 and 190. In various implementations, the user device 110 may include a mobile cellular phone, personal computer (PC), laptop, wearable computing device, etc. adapted for wireless communication, and each of the service provider server 130 and the manufacturer server 120 may include a network computing device, such as a server. Thus, it should be appreciated that the devices/servers 110, 120, 130, 180, and 190 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via a network 822, such as network 160 of FIG. 1. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid-state drive, a hard drive). The computer system 800 performs specific operations by the processor 814 and other components by executing one or more sequences of instructions contained in the system memory component 810. For example, the processor 814 can perform the token issuance and item authentication functionalities described herein according to the processes 600 and 700.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A device, comprising:
   one or more hardware processors; and
   a non-transitory memory storing instructions that, when executed by the one or more hardware processors, causes the one or more hardware processor to perform operations comprising:
     detecting, via an application of the device, an electronic interaction between the device and a first instance of a product;
     determining a code corresponding to the first instance of the product based on the electronic interaction;
     traversing a product blockchain comprising a plurality of blocks based on a token corresponding to the code, wherein the plurality of blocks includes data added to the product blockchain from a plurality of servers associated with the product;
     accessing, from the plurality of blocks, a set of blocks associated with the token based on the traversing;
     generating interactive content based on data stored in the set of blocks;
     detecting, by the application, an image of a second instance of the product captured by the device;
     modifying, by the application, the image based on the interactive content, wherein the modifying comprises superimposing the interactive content onto an area of the image corresponding to the second instance of the product based on analyzing the image; and
     presenting, via the application of the device, the modified image.

2. The device of claim 1, wherein the interactive content comprises promotional content associated with a manufacturer of the product.

3. The device of claim 2, wherein the data comprises content added to the product blockchain from a server associated with the manufacturer after the first instance of the product has been sold to a consumer.

4. The device of claim 1, wherein the interactive content comprises augmented reality data.

5. The device of claim 1, wherein the operations further comprise:
   receiving an interaction of a user of the device with the interactive content; and
   modifying the interactive content that is superimposed onto the area of the image.

6. The device of claim 1, wherein the operations further comprise:
   determining that a of the user device is an owner of the first instance of the product; and
   transferring the token to a digital wallet of the user.

7. The device of claim 6, wherein the operations further comprise:
   providing, via the application, an interface that enables the user to add user-generated content for the first instance of the product;
   receiving, via the interface, the user-generated content; and
   inserting the user-generated content into a block of the product blockchain in association with the token.

8. The device of claim 7, wherein the operations further comprise:
   transferring the token to a second digital wallet associated with a second user; and
   providing a second device associated with the second user access to the user-generated content from the product blockchain.

9. The device of claim 1, wherein the operations further comprise:
   determining that a of the user device is not an owner of the first instance of the product; and
   modifying the data based on excluding a portion of the data; wherein the interactive content is generated based on the modified data.

10. The device of claim 1, wherein the data comprises content that was added by a third-party entity not associated with the product, and wherein the interactive content comprises promotional materials associated with an accessory to the product.

11. A method comprising:
    detecting, via an application of a user device, an electronic interaction between the user device and a first instance of a product;
    determining, by the user device, a code corresponding to the first instance of the product based on the electronic interaction;
    traversing a product blockchain comprising a plurality of blocks based on a token corresponding to the code, wherein the plurality of blocks includes data added to the product blockchain from a plurality of servers associated with the product;
    accessing, from the plurality of blocks, a set of blocks associated with the token based on the traversing;
    generating, by the user device, interactive content based on data stored in the set of blocks;

detecting, by the application of the user device, an image of a second instance of the product captured by the user device;

modifying, by the application of the user device, the image based on the interactive content, wherein the modifying comprises superimposing the interactive content onto an area of the image corresponding to the second instance of the product based on analyzing the image; and presenting, via the application of the user device, the modified image.

12. The method of claim 1, wherein the data comprises content provided by a device associated with a manufacturer of the product.

13. The method of claim 12, wherein the content is received from the device after the first instance of the product has been sold to a consumer.

14. The method of claim 12, wherein the content comprises advertisement materials.

15. The method of claim 11, wherein the interactive content comprises promotional content associated with a manufacturer of the product.

16. The method of claim 11, further comprising:
determining that a user of the user device is an owner of the first instance of the product; and
transferring the token to a digital wallet of the user.

17. The method of claim 11, further comprising:
providing, via the application of the user device, an interface that enables a user of the user device to add user-generated content for the first instance of the product;
receiving, via the interface, the user-generated content; and
inserting the user-generated content into a block of the product blockchain in association with the token.

18. The method of claim 17, further comprising:
transferring the token to a second digital wallet associated with a second user; and
providing a second user device of the second user access to the user-generated content from the product blockchain.

19. The method of claim 11, further comprising:
determining that a user of the user device is not an owner of the first instance of the product; and
modifying the data based on excluding a portion of the data; wherein the interactive content is generated based on the modified data.

20. The method of claim 11, wherein the data comprises content that was added by a third-party entity not associated with the product, and wherein the interactive content comprises promotional materials associated with an accessory to the product.

* * * * *